United States Patent [19]

Nakai et al.

[11] Patent Number: 5,619,338
[45] Date of Patent: Apr. 8, 1997

[54] REPRODUCTION APPARATUS WITH A SEARCH FUNCTION

[75] Inventors: Masatoshi Nakai; Mitsutaka Kuwabara, both of Fukaya, Japan

[73] Assignee: Kabushiki Kaisha Toshiba, Kawasaki, Japan

[21] Appl. No.: 330,628

[22] Filed: Oct. 28, 1994

[30] Foreign Application Priority Data

Oct. 29, 1993 [JP] Japan .................................. 5-271641

[51] Int. Cl.$^6$ ............................................ H04N 5/76
[52] U.S. Cl. ........................ 386/70; 358/335; 386/106; 386/109; 386/126
[58] Field of Search ...................... 358/335, 342, 358/341, 311; 382/56; 360/10.1, 10.3; 369/32

[56] References Cited

U.S. PATENT DOCUMENTS

| | | |
|---|---|---|
| 5,107,343 | 4/1992 | Kawai ......................... 358/341 |
| 5,140,435 | 8/1992 | Suzuki et al. .................. 358/335 |
| 5,157,511 | 10/1992 | Kawai et al. .................. 358/335 |
| 5,239,382 | 8/1993 | Hatakenaka et al. ........... 358/335 |
| 5,267,334 | 11/1993 | Normille et al. ............... 382/56 |
| 5,455,684 | 10/1995 | Fujinami et al. ............... 358/335 |

*Primary Examiner*—Thai Q. Tran
*Assistant Examiner*—Luanne P. Din
*Attorney, Agent, or Firm*—Cushman, Darby & Cushman IP Group of Pillsbury Madison & Sutro LLP

[57] ABSTRACT

A desired frame image can be searched for and reproduced at high speeds. The same holds true for frame return reproduction. A data unit containing the video information compressed by encoding is stored in a data unit memory and decoded at a decoding unit. When the target frame is decoded, the decode output is stored in an image memory and supplied as a still reproduction image via a switch. The image memory can also be used as a memory for storing the decode output of the frame located at the mid-point between the start frame of the data unit and the frame currently being reproduced.

9 Claims, 16 Drawing Sheets

(OUTPUT IMAGE)

HIGH-SPEED TRANSFER RATE / FOR LARGE RECORDING CAPACITY / FOR SEMI-RANDOM ACCESS
○ REPRODUCING ONLY I ACHIEVES SIXTUPLE SPEED
○ REPRODUCING I & P ACHIEVES DOUBLE SPEED
　※ ACTUAL MULTIPLE SPEED IS LIMITED BY DATA READING SPEED FROM DISK
　※ I = IN-FRAME ENCODING, P = FORWARD PREDICTION
　　B = BIDIRECTIONAL PREDICTION

STRUCTURE OF MANAGEMENT TABLE

| TYPE | DATA LAYOUT |
|---|---|
| VID | (256BYTE) × 1 |
| PIF | (16BYTE) × NUMBER OF PROGRAM |
| DAT | (8BYTE) × NUMBER OF DATA UNITS |

FIG. 4A

PROGRAM INFORMATION FIELD (PIF)

| PARAMETER | DESCRIPTION | NUMBER OF BYTES USED |
|---|---|---|
| ATMB | ABSOLUTE STARTING TIME | 2BYTES |
| PINF | PROGRAM ATTRIBUTE | 1BYTE |
| GINF | GOP COMPONENT ATTRIBUTE | 1BYTE |
| EINF | EXPANSION CODE ELEMENT | 1BYTE |
| AINF | AUDIO ENCODING SYSTEM | 1BYTE |
| VINF | VIDEO ENCODING SYSTEM | 1BYTE |
| ATRP | PICTURE ATTRIBUTE | 1BYTE |
| HRES | HORIZONTAL RESOLUTION | 2BYTES |
| VRES | VERTICAL RESOLUTION | 2BYTES |
| PNTB | STARTING POINTER | 2BYTES |
| PGML | PROGRAM LINK | 2BYTES |

FIG. 4B

DATA-UNIT ALLOCATION TABLE (DAT)

| PARAMETER | DESCRIPTION | NUMBER OF BYTES USED |
|---|---|---|
| NZON | ZONE NUMBER | 1BYTE |
| NSCT | SECTOR NUMBER | 1BYTE |
| NTRC | TRACK NUMBER | 2BYTES |
| PTMB | PROGRAM TIME | 2BYTES |
| PNTL | LINK POINTER | 2BYTES |

FIG. 4C

| FRAME\MEMORY | 1 | 2 | 3 | 4 | 5 | 6 | 7 | 8 | 9 | 10 | 11 | 12 |
|---|---|---|---|---|---|---|---|---|---|---|---|---|
| 405a | D1 | M1 | M1 | D4 | D5 | D6 | M6 | M6 | M6 | M6 | M6 | M6 |
| 405b | D1 | D2 | D3 | M3 | M3 | M3 | D7 | D8 | D9 | D10 | D11 | D12 |

M : USED AS STILL IMAGE FRAME
D : USED AS DISPLAY FRAME $$\sum_{n=7}^{11} n t de = (11+10+9+8+7) t de = 46 t de \quad ---- (A)$$

$$\sum_{n=7}^{10} n t de = (10+9+8+7) t de = 35 t de \quad ---- (B)$$

$$\sum_{n=7}^{11} (n-6) t de = (5+4+3+2+1) t de = 10 t de \quad --- (C)$$

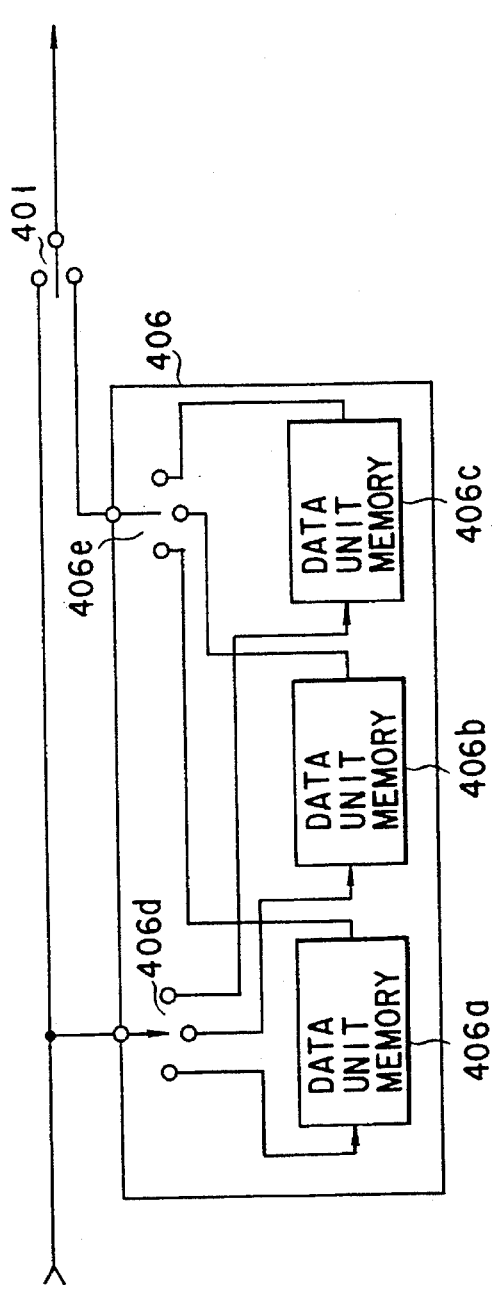
F I G. 13A
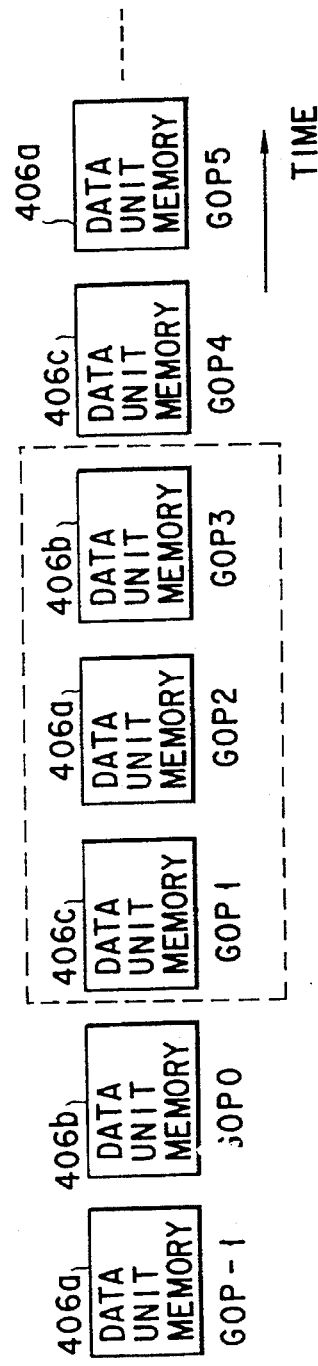
F I G. 13B

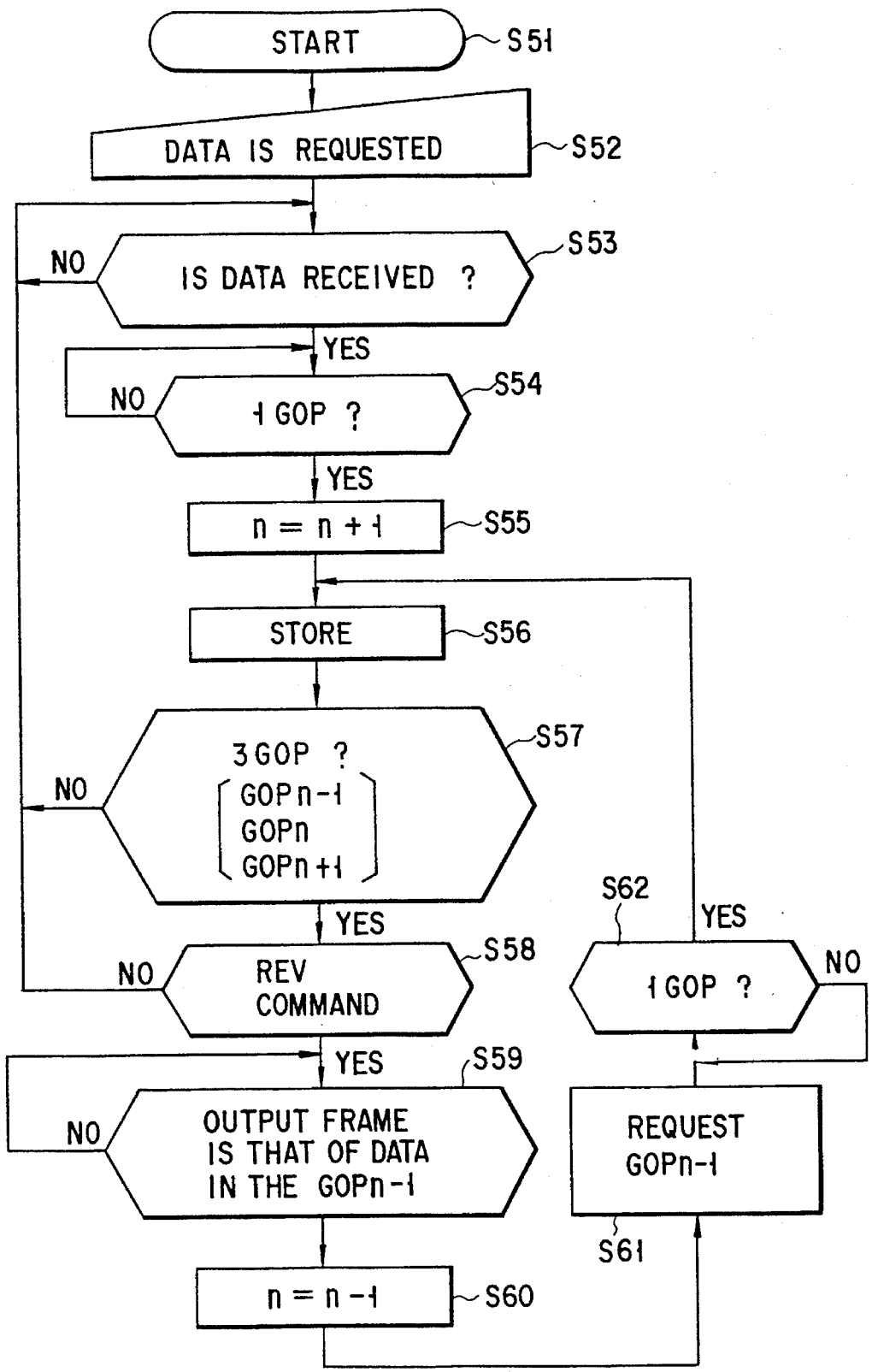
F I G. 17

REPRODUCTION APPARATUS WITH A SEARCH FUNCTION

BACKGROUND OF THE INVENTION

1. Field of the Invention

This invention relates to a reproduction apparatus capable of recording and reproducing a program, such as a movie, on a recording medium, such as an optical disk or a CD-ROM, and more particularly to a reproduction apparatus with a search function capable of searching for a desired frame at a high speed.

2. Description of the Related Art

Since such recording mediums as magnetic disks or optical disks provide high-speed data access, though they have a smaller memory capacity than magnetic tape, they facilitate the reading, the transferring, and the head-locating of a program of moving-picture data. Recent advances in high-efficiency coding technology for image data have made it possible to store many programs, and recording and reproduction systems using such disks as recording mediums will find their way into a wider variety of applications. Such moving-picture compression recording techniques include a system prescribed by ISO-11172 (MPEG).

Such reproduction systems are also required to provide still reproduction, frame supply reproduction, and frame return reproduction. With the image data recorded by high-efficient coding techniques, when these functions are carried out, it is impossible to access and reproduce a desired frame directly. Because of this, it would take time to get the desired frame.

SUMMARY OF THE INVENTION

Accordingly, the object of the present invention is to provide a reproduction apparatus with a search function capable of searching for a desired frame at a high speed.

The foregoing object is accomplished by providing a reproduction apparatus for a disk in which a management area is formed in a portion thereof and a data area is formed in another portion thereof, programs being recorded in the data area, each of the programs being composed of a plurality of data units, each of the data units containing a specified number of frames of video information each compressed by frame correlation, and information on the start addresses of the plurality of data units being stored in the management area, the reproduction apparatus comprising: pickup means for reading the information from the disk; demodulation means for demodulating the output signal of the pickup means; management information storage means for storing each piece of management information in the management area outputted from the demodulation means; a data unit memory for storing the data units outputted from the demodulation means; video decode means for decoding video information on the data units outputted from the demodulation means; an image memory for storing a frame (or a field) of image data outputted from the video decode means; means for, when a frame number is inputted for high-speed searching, determining by calculation which data unit on the disk the target frame corresponding to the frame number belongs to, and reading the target data unit obtained from the calculation result from the disk according to the start address in the management information, and storing the read target data unit in the data unit memory; means for supplying the video information on the target data unit stored in the data unit memory to the video decode means, which then decodes it; and means for counting frame synchronizing pulses in the course of decoding the video information on the target data unit, and performing still reproduction by storing the decode output in the image memory, when the target frame is decoded.

The above means provide the high-speed search of a target frame and allow the data unit memory and the image memory to be used for high-speed frame return reproduction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4C show management tables for explaining the types of data items in the data management area recorded on a disk according to the invention;

FIG. 13A is a block diagram of the primary portion of another embodiment of the present invention, and FIG. 13B is its explanatory diagram;

FIG. 17 is a flowchart of the operation of the terminal of FIG. 16; and

DETAILED DESCRIPTION OF THE PREFERRED EMBODIMENTS

Hereinafter, embodiments of the present invention will be described, referring to the accompanying drawings.

Figure 1:
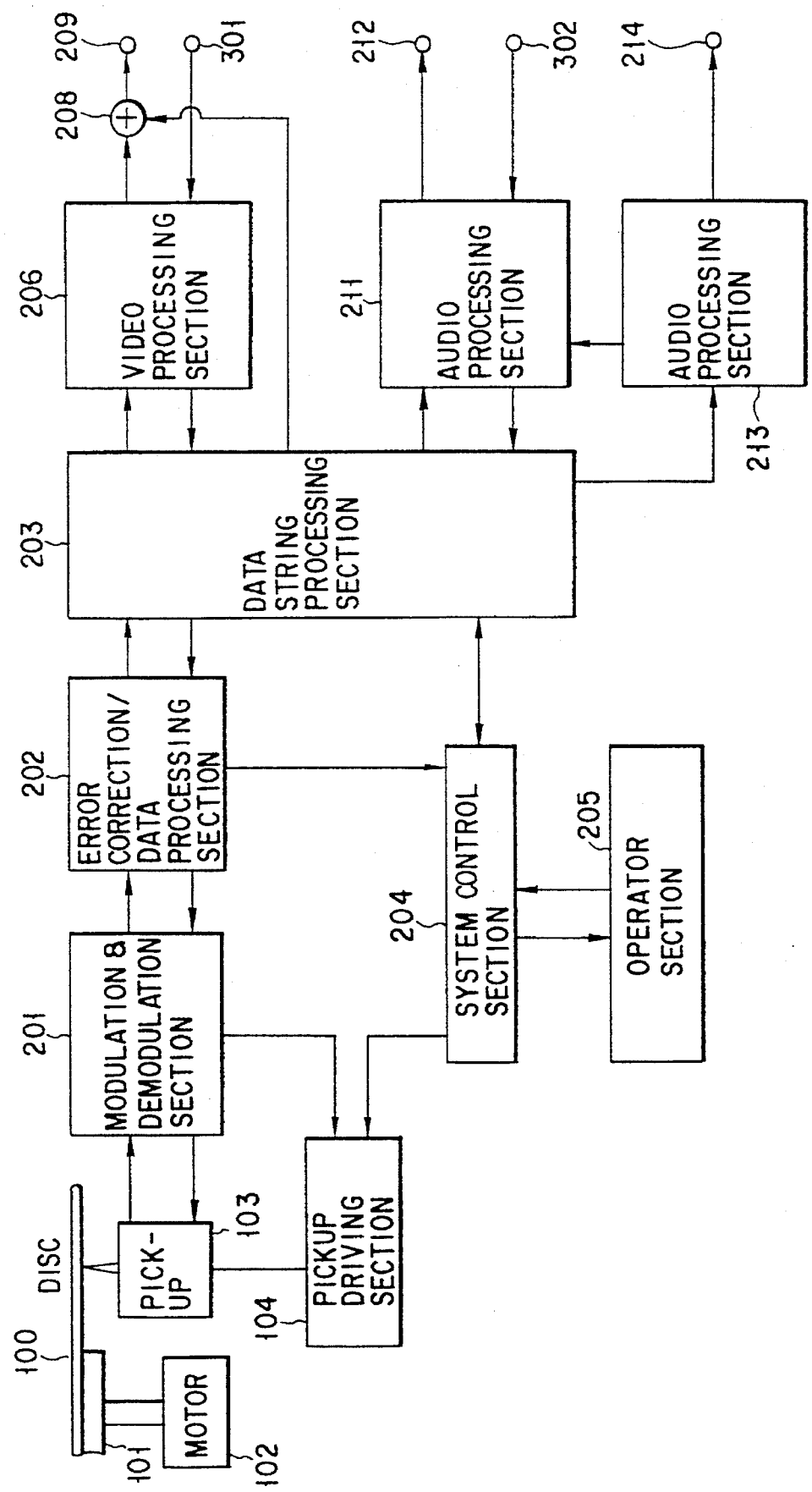
FIG. 1 is a block diagram of a reproduction apparatus according to an embodiment of the present invention.

In FIG. 1, a recording medium 100 such as an optical disk (hereinafter, referred to as a disk) of the present invention is installed in a recording and reproduction apparatus (accessing apparatus).

The disk 100 is placed on a turntable 101, which is rotated by a motor 102. In the reproduce mode, the information recorded on the disk 100 is read by pickup means 103. A pickup driving section 104 provides movement and tracking control of the pickup means 103. The output of the pickup means 103 is supplied to a modulation and demodulation section 201, which demodulates the supplied signal. The demodulated data is supplied to an error correction data processing section 202, which corrects errors and supplies the resulting signal to a data string processing section 203. The data string processing section 203 extracts video information, subtitle and character (or letter) information, and audio information. On the disk 100, the subtitle and character information and audio information are recorded so as to correspond to the video information, as explained later. Here, various languages can be selected for the subtitle and character information and audio information. The selection is made under the control of a system control section 204. The user supplies the input from an operator section 205 to the system control section 204.

Further, it is assumed that, for example, information on a movie is recorded on the disk 100. In this case, a plurality of scenes that the user can select are recorded. To deal with these scenes, the data string processing section 203, the system control section 204, and the operator section 205 in the reproduction apparatus constitute data string control means and scene select means according to the operation of the user.

The video information separated at the data string processing section 203 is supplied to a video processing section 206, which carries out a decoding process according to the type of display unit. For example, the video information is converted into a suitable form for an NTSC, PAL, SECAM, or wide screen. The video signal decoded at the video processing section 206 is supplied to an adder 208, which adds it to the subtitle and character information and supplies the addition result at an output terminal 209. The audio information separated at the data string processing section 203 is supplied to an audio processing section 211, which demodulates it and supplies the demodulated signal at an output terminal 212.

The audio processing section acting as a decoding section, which contains an audio processing section 213 in addition to the audio processing section 211, can also reproduce speech in another language and supply the reproduced signal at an output terminal 214 (this function will be explained later).

The above apparatus can also record. In a record operation, a recording video signal is supplied to an input terminal 301 and a recording audio signal is supplied to an input terminal 302. In this case, the video processing section 206 acts as a video encoder, and the audio processing section 211 serves as an audio encoder. The data string processing section 203 functions as a recording information formatter, and the error correction data processing section 202 acts as an error code adding section. The data thus processed is modulated at the modulation section 201 of the modulation and demodulation section 201 and the modulated signal is supplied to the pickup section 103.

As described above, the disk 100 used in this invention stores pieces of video information related to each other. With this disk, the reproduction apparatus can reproduce any one of the pieces of video information or change the reproducing state from one video to another, as specified by the user.

In addition, on the disk, information on various languages, audio information including music information and background sound information, and subtitle information in various languages are recorded according to the video information. To determine which information should be reproduced, the audio data string processing section 203, system control section 204, and operator section 205 constitute data string control means and scene select means.

Figure 2A:
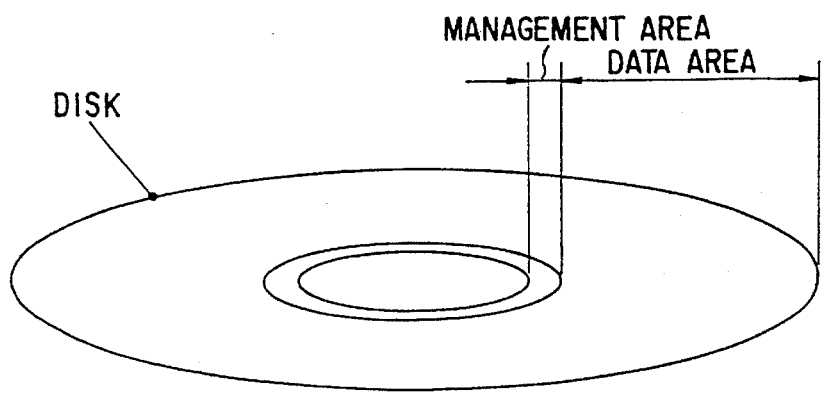
FIG. 2A illustrates an information area on a disk associated with the present invention.

FIG. 2A shows the information area on the optical disk 100. The optical disk 100 has a management area on the inner side and a data area outside the management area. In the management area, management data for managing the programs in the data area is recorded as explained later. In the data area, information including subcode information, subpicture information, audio information, and video information is recorded.

First, what types of information are recorded in the data area will be explained, referring to FIG. 2B.

Figure 2B:
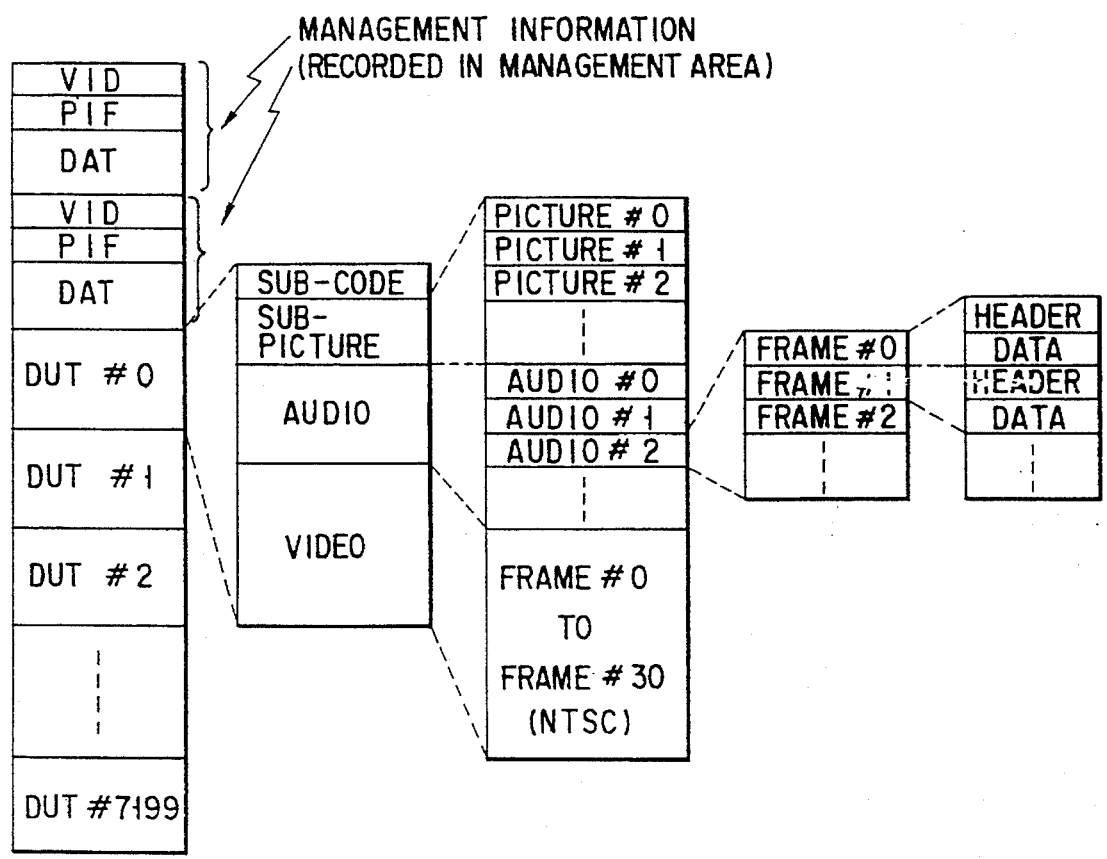
FIG. 2B is a diagram to help explain a data format of the data recorded on a disk of the invention.

FIG. 2B is an enlarged view of the contents of data unit DUT #0 in the data area. In data unit DUT #0, there is a subcode (SUB-CODE) at the start, followed by a subpicture (SUB-PICTURE), audio information (AUDIO), and video information (VIDEO) in that order. The subcode (SUB-CODE) contains the attributes of data unit DUT #0, which contains an address (the zone number, the track number, the sector number, the unit number, etc.) and control information for the data unit. The subpicture (SUB-PICTURE) contains subtitle information (for movie video) or character information (for kara-OK video and educational video), for example. The subtitle information and the character information are each given PICTURE #0 through #4, all of which or some of which differ from each other in language and the rest contain no signals. The audio (AUDIO) information is recorded as music information or in five different languages, for example, in five languages AUDIO #0 through #4 (each reproduction lasts approximately one second). Each piece of AUDIO information is recorded in frames, each frame, #0, #1, . . . being composed of headers (HEADERs) and data (DATA). The video information (VIDEO) contains 30 frames of images (which will last approximately one second when reproduced), for example. The video (VIDEO) formation is recorded by high-efficiency image encoding techniques. The number of frames is not limited by standards. The audio information is also subjected to high-efficient encoding techniques.

Explained next will be the recording format of video (VIDEO) information.

First, a moving-picture compression format will be described. When image data is encoded, groups of pictures (GOPs) are formed into a packet, and the speech data (of approximately 1.0 sec) equivalent to the packet, the subcode, and the subpicture are encoded. This encoded data is added to the compressed image data to form a data unit. Each GOP is fixed in the same program. An audio synchronizing time code is used as the subcode at the beginning of the expansion data in the data unit.

Figure 3A:
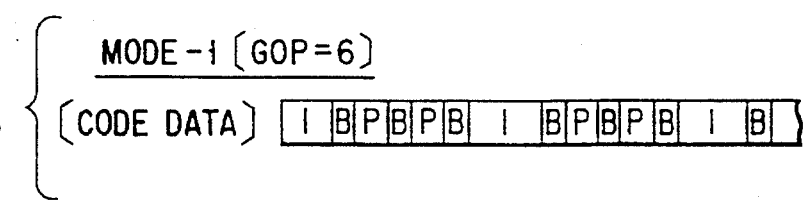
FIGS. 3A to 3C are diagrams to help explain a signal compression format in connection with the present invention.
Figure 3B:
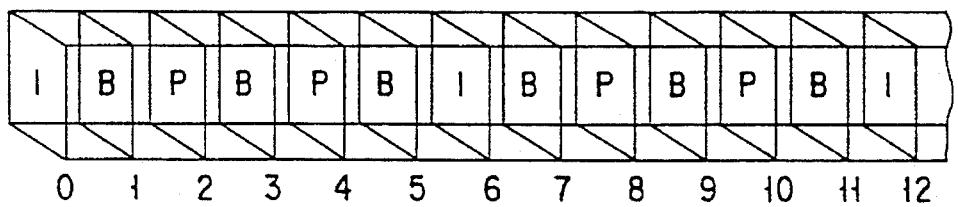
Figure 3C:
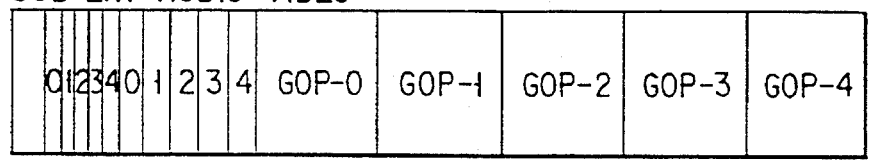

FIG. 3 graphically shows an example of the encoded data (FIG. 3A) and the output image (FIG. 3B) decoded from this data. In the figure, I indicates the image data encoded in a frame, P the image data encoded by forward prediction, and B the image data encoded by bidirectional prediction. In this mode, the image data is encoded repeatedly in this order: I, P, B, P, B. As a result, the length of the encoded data differs from frame to frame. With such a format, reproducing only I provides a sextuple-speed image, and reproducing I and P generates a double-speed image. The actual multiple speed is limited by the speed at which the data is read from the disk. This GOP structure is suitable for a high-speed transfer rate, a large recording capacity, and semi-random access. In this example, as shown in FIG. 3C, six frames are treated as a GOP. Then, five GOPs form a packet. This packet corresponds to one second of reproduction. The actual length of recorded signals on the disk differs from packet to packet since the signals are encoded by moving-picture compression techniques.

Therefore, a packet consists of 30 frames (=5 GOPs×6 frames/GOP). Each one second of speech data is recorded in 48K bytes (=4 ch×12K bytes/s). When there are two channels used simultaneously, the minimum memory capacity needed may be 24K bytes.

The primary data item and the information rate for each data unit to be recorded on the disk are as follows:

Expansion data = 128K bits/s = 16K bytes/s
Speech data = 384K bits/s = 48K bytes/s
Image data = 4096K bits/s = 512K bytes/s The expansion data contains a subcode and subimage data. The subimage data can be used for subtitle information used in moving pictures. The subcode is individual management information in the data unit and also contains speech and image synchronizing information. The subimage data is updated on a GOP basis containing the corresponding main image. The synchronization of image and speech and the correction of synchronization are also carried out on a GOP basis.

For subtitle information, more than one channel may be provided for the subimage data so that two types of subimages can be selectively outputted as the English scenario and the Japanese subtitles on a foreign film can be. When the allocated rate of the subimage data is 64K bits/s, if the recording time of one packet is 1.0 second, the buffer memory capacity for holding the subimage data is approximately 64K bits. The buffer memory capacity needed for two channels of subimage may be 32K bits.

When each of the image, speech, and expansion data is encoded, they are completed within the data unit and are totally independent from other data units.

The management information recorded in the management area will be explained further. The management information is recorded in the form of a table.

Figures 5A, 5B:
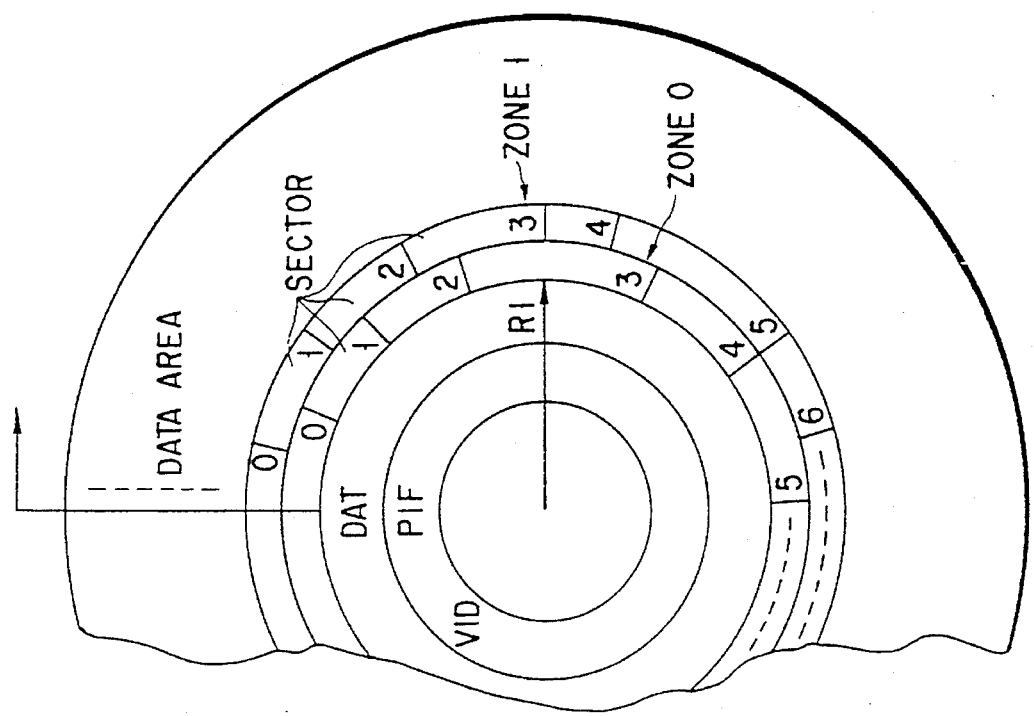
FIG. 5A illustrates a disk data layout and FIG. 5B shows a management table on the disk.

The management table, as shown in FIG. 5A, contains a volume identity field (VID) around the innermost circumference, a program information field (PIF) outside the VID, and a data unit allocation table (DAT) outside the PIF.

On the basis of the information in the management area, reading is done for each data unit. Because in this system, processing is effected independently for each data unit, it is easy to edit and access each data unit.

The relationship between the data area and the associated management information will be described.

In the actual layout, a byte align process is performed for each GOP, and a sector align process is always carried out for each data unit to make it easy to segment the data unit. In a reproduce operation, the image is decoded, beginning with the start frame of a GOP (I picture). The speech is decoded, beginning with the speech frame specified by the image synchronization. At the time when the decoding of both of the specified speech frame and the start frame of the image GOP has been completed, the image and the specified speech sample start to be outputted simultaneously.

For speech data, approximately 1.0 second of encoded speech data is inserted in the data unit. After a certain number of samples are grouped into a block with adjacent block edges tucked a little, the speech is encoded in units of this number of samples, and a header is added to the encoded speech to form an encoded speech frame.

The length of speech frame is less than the length of 2048 samples of the original speech, and corresponds to 24 ms to 36 ms in terms of the duration of the original speech. The encoded data amount of the speech frame ranges from 288 bytes to 576 bytes. A frame ID is added to the header of each speech frame in each speech channel. The frame ID is made up of 24 bits, 4 bits of which represent a speech channel and 20 bits of which indicate a speech frame number. The approximately 1.0 second of encoded speech data is usually as long as several tens of speech frames, though the length varies with the number of samples in a block and the sampling frequency. The image-sound synchronization added to the subcode specifies the frame number of the encoded speech to which the decoded speech sample to be outputted with the timing of outputting the start frame of the corresponding GOP belongs, and the speech sample number in the frame. The time code consists of 32 bits, 20 bits of which represent a speech frame number and the remaining 12 bits of which specify a speech sample number. This enables the maximum error in the speech-image synchronization in the entire system to coincide with half the sampling period of speech. When fs=32 KHz, the maximum speech synchronization error is approximately 16 us.

FIG. 4A shows the structure of the management table. The VID is written, starting at the first byte in the management table area, and indicates information on various elements throughout the disk by using 256 bytes. For example, this information includes information as to whether the disk is for general recording or for reproduction only.

In the program information field (PIF), various pieces of information on each program are recorded. For example, 16 bytes are used for each program.

FIG. 4B shows an example of the contents of 16 bytes in the PIF.

ATMB indicates the absolute time of the starting point of the present program in the volume. In a time code search operation, each item of ATMB data is checked in the order of reproducing programs to find the number of the program in which a desired time code is present. Each DAT (explained later) in the corresponding program is checked. Then, the sum of the program time (PTMB, explained later) and the ATMB is compared with the desired time code value to find the DAT to which the corresponding time code belongs. In this procedure, searching can be effected. By the method based on the absolute starting time, the user can find the absolute starting time from the desired program number and therefore, can sense a specific item of PIF data by searching for the ATMB corresponding to the absolute starting time.

PINF indicates program attributes. The program attributes, which are allocated to each program, include a copy disable flag (CPNH), a program type (PTYPE), a write attribute (PWRT), and the number of GOPs forming a data unit (SGDU). If the CPNH is set at 1, it means copy disable and if it is set at 0, it means copy enable. The PTYPE, which consists of three bits, indicates such types as the home video, movie, music, kara-OK, computer graphics, interactive use, game, computer data, or program. When the PWRT has a value of 1, it means write enable.

The PIF also includes the parameters as shown in FIG. 4B, in which AINF indicates the identification of a speech encoding system, VINF denotes the identification of an image encoding system, ATRT represents the picture attributes (i.e., information for identifying the aspect ratio and a system such as the PAL or the NTSC system), and HRES and VRES indicate the information on horizontal resolution and vertical resolution, respectively.

PNTB indicates a start pointer that has a value indicating the DAT address (data unit number) at which the data unit at the program starting point is stored. An explanation of DAT will be given below. Once the DAT address (data unit number) has been determined, the position of the start sector of a program in the data area can be determined.

PGML indicates the program number to be processed immediately after the current program is finished, when related programs are present. Namely, the order in which programs are reproduced does not necessarily coincide with the order of program numbers. When the current program is the last program, there is no link destination and all bits of the PGML have 1s.

FIG. 4C shows the structure of the DAT. In this table, there are such parameters as a zone number (NZON), a sector number (NSTC), and a track number (NTRC), a program time (PTMB), and a link pointer (PNTL). From the zone number, the track number, and the sector number, the recording sector at the start of the data unit can be determined.

NZON is the zone number to which the recording sector at the start of the data unit belongs. The disk is divided into tracks radially from the innermost circumference, a plurality of tracks being grouped into a unit, and the zone numbers are allocated to each unit. Specifically, as shown in FIG. 5A, the data area has a reference position R1 on the disk and the number begins with 0 at this position. A zone consists of many tracks. NSTC indicates a sector number in the track. The sector number is not a serial number associated with another track or zone but a number complete only within the track. NTRC indicates a track number in the zone. PTMB is a flag representing the time position information on the image data (I picture) at the start of the data unit. The position information indicates a relative elapsed time (in seconds) from the program starting point. The time position information is used in searching for time codes explained earlier. Further, the time position information is taken in by the reproduction apparatus, which uses it as the start reference data in order to display the program time, absolute time, remaining time, etc.

PNTL is a flag showing a subsequent data unit immediately following the present DAT unit number in time. The unit corresponds to the data unit number. When there is no link destination at the program end, all bits are set at 1 (=0xFFFF). The effective value for the link pointer ranges from 0x0000 to 0xFFFF.

FIG. 5A graphically shows the management area and data area. The blocks in the data area each indicate programs.

FIG. 5B shows an example of the DAT. The DAT unit numbers are continuous in this order: 0 to Nmax. By referring to the PNTB in the PIF, the first DAT unit number is determined. If the DAT unit number is 1, then the next link pointer will be 0. The link pointer of DAT unit number 0 is Nmax−1. The link pointer of DAT unit number Nmax−1 is 2. By checking for the zone number, the sector number, and the track number according to the change of the DAT unit number, it is possible to obtain information on the reproduction order such as track 4 in sector 3 in zone 1, track 7 in sector 2 in zone 0, and track 10 in sector 30 in zone 3.

As has been described above, in this system, the video information is encoded for compression and is recorded (see FIG. 3). In this example, as shown in FIG. 3C, six frames are treated as a GOP and five GOPs form a packet (in a data unit). To decode the video information in a data unit in the video processing section 206, it is necessary to perform a decoding process in a specified procedure.

The reproduction apparatus is required to perform still reproduction of a single image frame, frame supply or frame return, for example. To meet these demands, this system, when performing these functions, searches for and reproduce frames at high speeds and enables fast frame supply reproduction.

Figure 6:
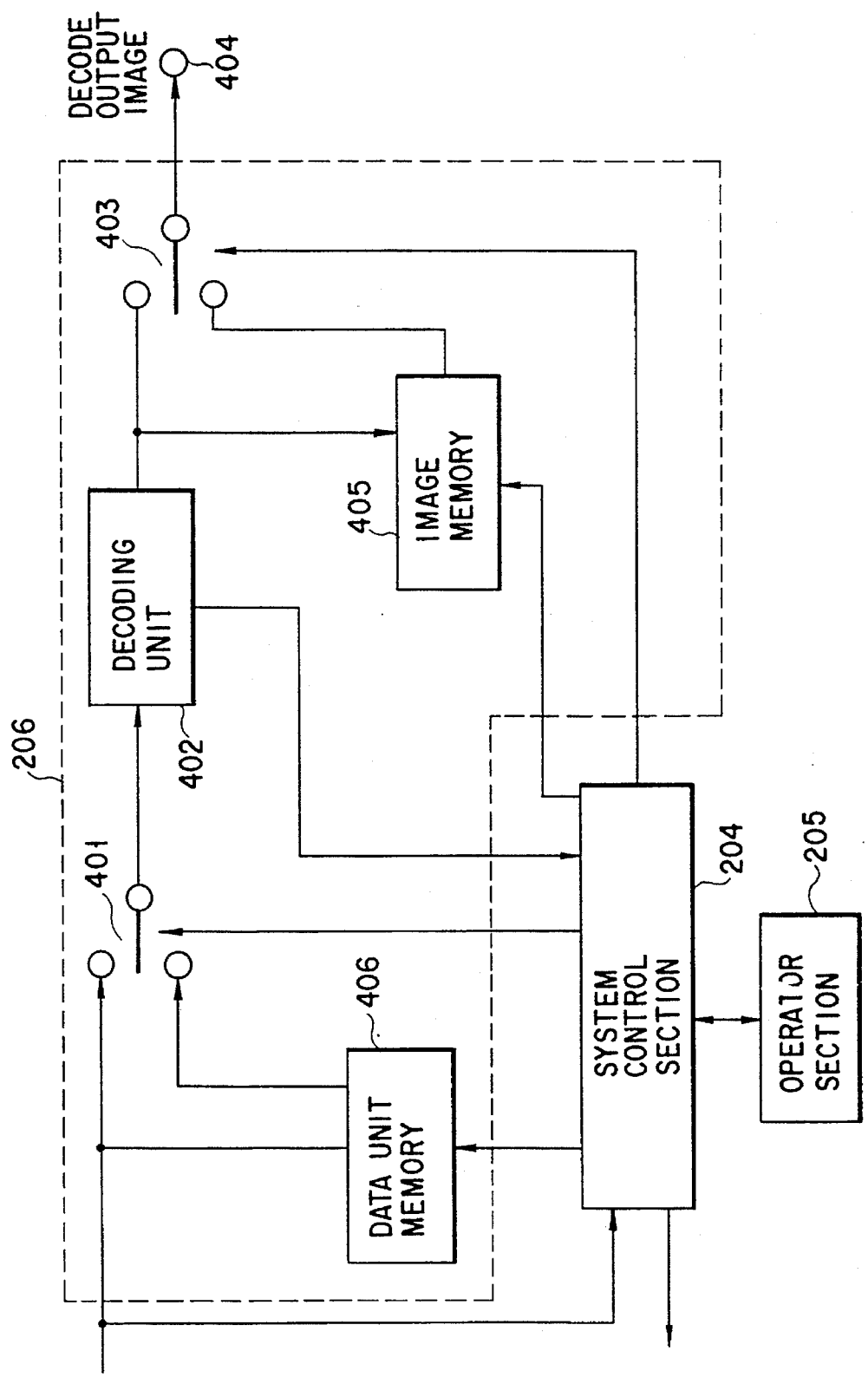
FIG. 6 is a block diagram of a searching section of the apparatus of the invention.

FIG. 6 shows sections related to the present invention. The video information in a data unit in the program selected at the data string processing section 203 is supplied to the video processing section 206. This video information is supplied via a switch 401 to a decoding unit 402, which decodes it. The decoded output image signal is supplied via a switch 403 to an output terminal 404. In a normal reproduction, the above-mentioned signal processing system is formed.

Figure 7:
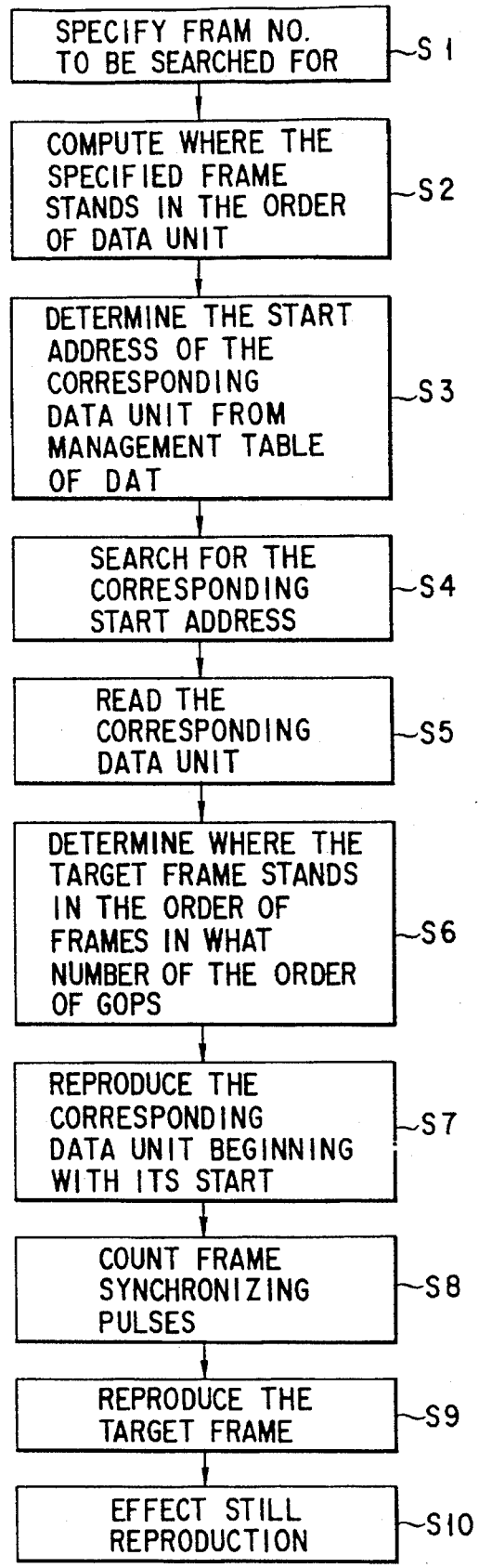
FIG. 7 is a flowchart for the operation of the apparatus of the invention.

Here, for example, it is assumed that an image search operation is performed. FIG. 7 shows the flow of searching for images. For example, the number of absolute frames is specified as the frame number to be searched for from the operator section 205. The number of absolute frames entered from the operator section 205 is read by the system control section 204. The control section 204 calculates the position of the data unit to which the frame belongs from the number of absolute frames specified. For example, this calculation is done as follows. As noted earlier, if the number of frames in a data unit is 30 and the total number of data units is, for example, 7200, the total number of frames in this system will be 216000 frames. This value is already known.

If the number of frames specified is 100000, the data unit to which the number of absolute frames specified 100000 belongs will have a value of 100000/30=3333.33. As a result, the specified absolute frame (the first one in this case) belongs to the absolute 3334th data unit.

Then, the data unit number and the number information on the target frame are stored. Which GOP the specified absolute frame belongs to may be determined and stored. In this example, it belongs to the first GOP. The system control section 204 recognizes the start address of the corresponding data unit by referring to the management table. In the management table, the start address of the data unit is stored as explained in FIG. 5. The system control section 204, after recognizing the start address of the data unit, determines the direction in which the start address is located (the inward direction or the outward direction of the disk) from the start address of the data unit now being reproduced. Then, it moves the pickup 103 toward the start address to be searched for. At this time, the image frame supplied from the decoding unit 402 is written in the image memory 405, from which the stored frame is read as a still image. At this time, the switch 403 is controlled so as to select and supply the output of the image memory 405 to the output terminal 404.

Because during a search operation, the data string processing section 202 supplies the video information (the data unit and its start address) to the system control section 204, it is possible to sense whether or not the data unit to be searched for has been entered. If the data unit to be searched for has been entered, the data unit is written in the data unit memory 406. The switch 401 is controlled so that the data unit written in the data unit memory 406 may be decoded at the decoding unit 402. The decoding unit 402 then starts decoding the target data unit. At the same time, the system control section 204 senses which frame is being decoded at the decoding unit 402 by counting the frame synchronization. When the target frame has been decoded (in this example, the first frame in the absolute 3334th data unit= 100000), the system control section 204 writes this frame image in the image frame memory 405. When a frame has been written, the image memory 405 is frozen. This allows a still image of the specified frame to appear on the monitor. FIG. 7 is a flowchart for the operations at steps S1 to S10.

This system is also provided with a function enabling high-speed frame supply and return reproduction.

For example, there may be a case where the user wants to look at the preceding and the following image after the target frame has been searched for as described above. In this case, if a data unit is decoded and reproduced, starting from the beginning to the end in sequence, it will take one second before the last frame is decoded (see FIG. 3). Since in image compression techniques, compression is performed on the basis of the correlation between the preceding and the following frame, the compressed frames must be decoded in a specified sequence. If it takes an average of 30 ms to reproduce a frame, it will take 30×20 ms to reproduce the 20th frame. To overcome this drawback, in this system, the decode output of the frame located at the mid-point between the frame now undergoing still reproduction and the start frame is stored in the frame memory.

Figure 8:
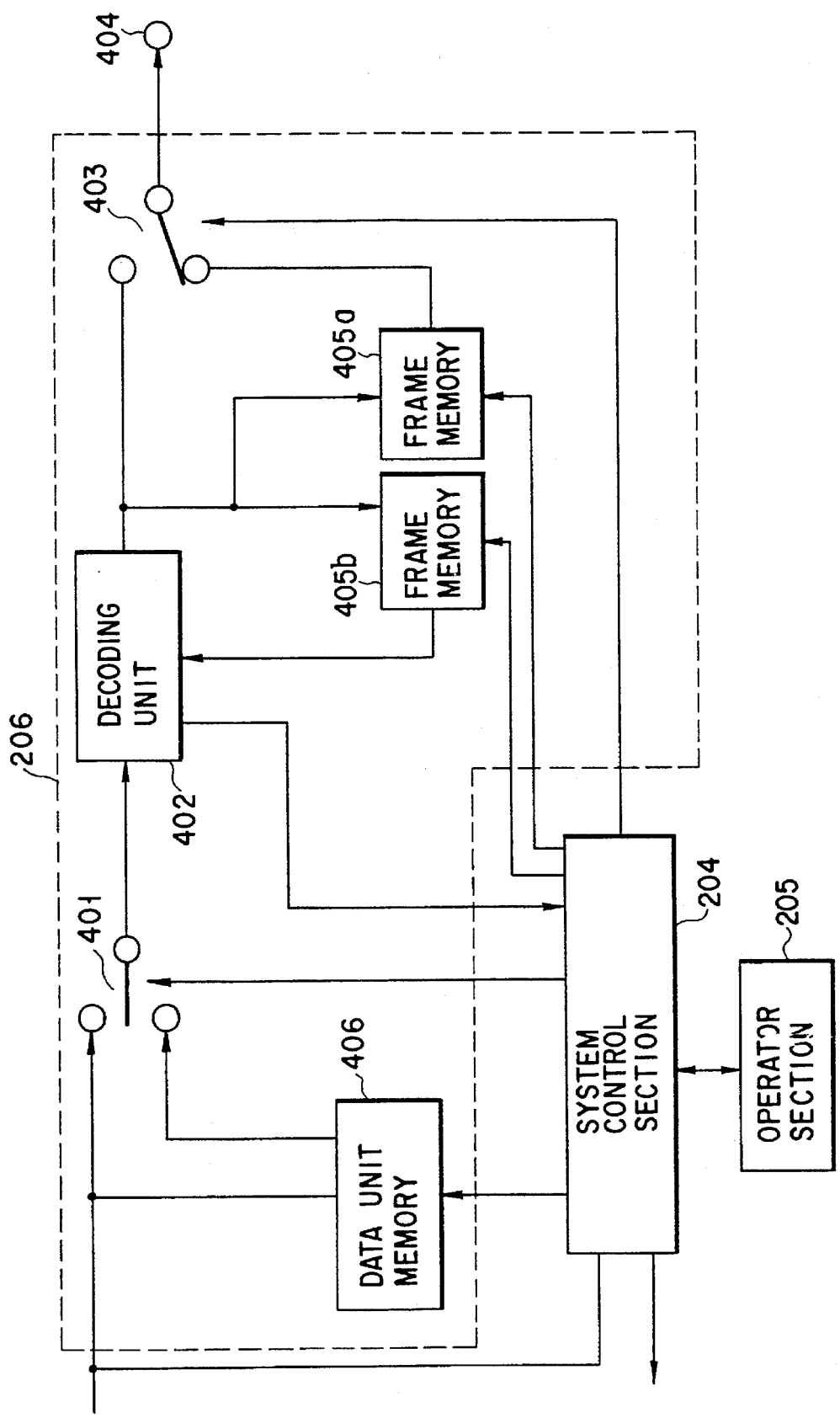
FIG. 8 is a block diagram of the searching section and the frame return section of the apparatus of the present invention.

FIG. 8 is a block diagram of a frame supply and return reproduction portion of the signal processing section. The same parts as those in FIG. 6 are indicated by the same reference symbols. In this signal processing section, the image memory 405 of FIG. 6 is represented as frame memories 405a and 405b in FIG. 8. The frame memory 405a stores image data for still reproduction as described earlier. The frame memory 405b stores the image data on the frame located at the mid-position between the frame now undergoing still reproduction and the start frame of the data unit to which the frame now in still reproduction belongs.

For example, if the target frame searched for at a high speed is the 20th frame in a data unit, the image data on the 20th frame will be stored in the frame memory 405a and undergo still reproduction, whereas the frame memory 405 stores, for example, the image data on the 10th frame. When the 10th frame is reached in the course of searching for the 20th frame, its image data is decoded and stored in the frame memory 405b.

While the reproduced image of the 20th frame is being displayed on the screen, if the user wants to see the preceding frame, he carries out a frame return operation via the operator section 205. Then, the compressed data necessary for reproduction of the 11th frame is supplied from the data unit memory 406 to the decoding unit 402. The image data on the 10th frame is also supplied from the frame memory 405b to the decoding unit 402. As a result of this, the decoding unit 402 need not to encode the data unit from the beginning, but only has to encode from the 11th frame and, at the time when the 19th frame has been decoded, write this frame in the frame memory 405a. This allows the still image of the 19th frame (moved backward) to be obtained in a short time. In the case of frame supply, decoding may be effected from the 11th frame upward in sequence. The image data on the 20th frame stored in the frame memory 405a may be fed back to the decoding unit 402, which then decodes the next frame. Although only one frame memory 405b is used, more frame memories may be used so as to hold, for example, an I picture in sequence for each data unit of FIG. 3, and use these pictures for decoding.

Figure 9:
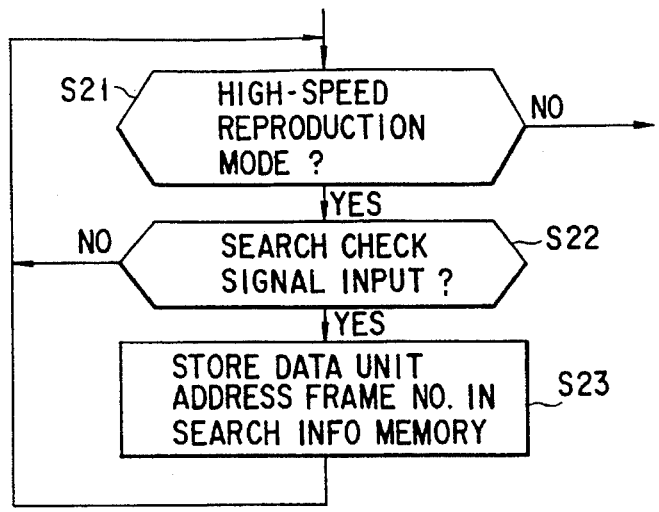
FIG. 9 is a flowchart for the continuous search function of the apparatus of the invention.

In the above embodiment, the user enters the target frame number form the operator section and searches for the corresponding frame on the basis of the entered target frame number. When the user does not know the target frame, however, he can enter a search check signal near an interesting image while performing high speed reproduction, and later on, take his time in searching for that portion. Namely, with this system, a search check signal can be entered in the high-speed reproduction mode. FIG. 9 is a flowchart for explaining the function.

When the reproduction apparatus is in the high-speed search mode (step S21) (for example, at this step, only the I and P frames in FIG. 3 are reproduced sequentially), the user can enter a search check signal from the operator section. For example, this signal is read by the system control section 204 when a check button is pressed. At this time, the system control section 204 carries out reproduction, while recognizing the address and frame number of the data unit now being reproduced. At the time when the search check signal has been entered (step S22), the address and frame number of the data unit currently being reproduced are paired and the pair is stored in the search information memory (step S23). In this way, more than one check point can be stored in the search information memory.

Next, when the reproduction apparatus is set in the search mode, the address and frame number of the data unit in the search information memory are read and the corresponding frame starts to be searched for. The searching operation is such as described above. After the target frame has been sensed, the still reproduction of the frame is effected. In this state, when a subsequent search instruction is entered, the address and frame number of the next data unit are read from the search information memory and the corresponding frame starts to be searched for.

The frame return reproduction explained in FIG. 8 will be described further.

In FIG. 8, there are provided frame memories 405a and 405b. One memory stores the image data on the frame currently being displayed, whereas the other memory stores the image data on the past frame in order to shorten the time required to decode data for frame return reproduction. There are various methods of selectively storing the past frame: for example, a method of selecting and storing the preceding frame with respect to the frame now being displayed, a method of selecting and storing a frame a fixed number of frames away from the frame now being displayed, and a method of previously selecting a frame to be stored.

FIG. 10 graphically shows examples of the relationship between the order of frames to be reproduced and outputted, the frame currently being displayed, and the frame to be stored.

Figure 10A:
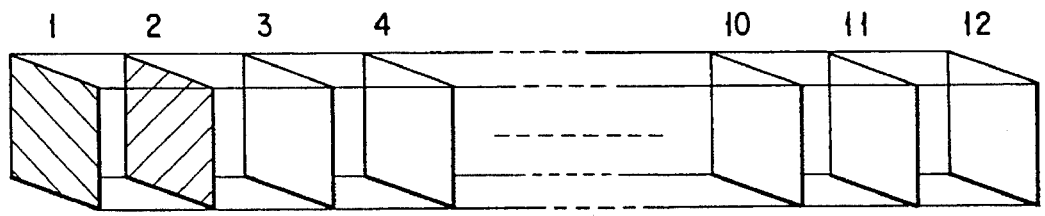
FIGS. 10A to 10C graphically show reproduction frames to explain the frame return operation in the apparatus of the present invention.
Figure 10B:
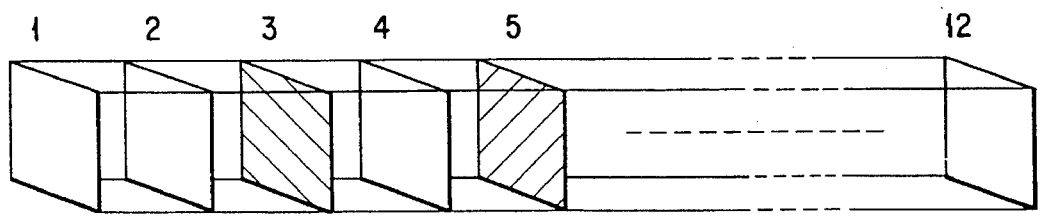
Figure 10C:
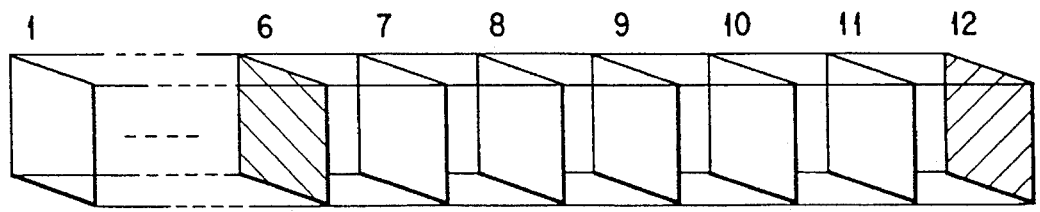

FIG. 10A shows an example in which the frame now being displayed is the second frame and the frame stored in the frame memory is the first frame immediately before the second one. FIG. 10B shows an example in which the frame now being displayed is the fifth frame and the frame stored in the frame memory is the third frame two frames ahead of the fifth one. FIG. 10C shows an example in which the frame now being displayed is the 12th frame and the frame stored in the frame memory for preparation is the sixth frame.

Figures 11A, 11B, 12:
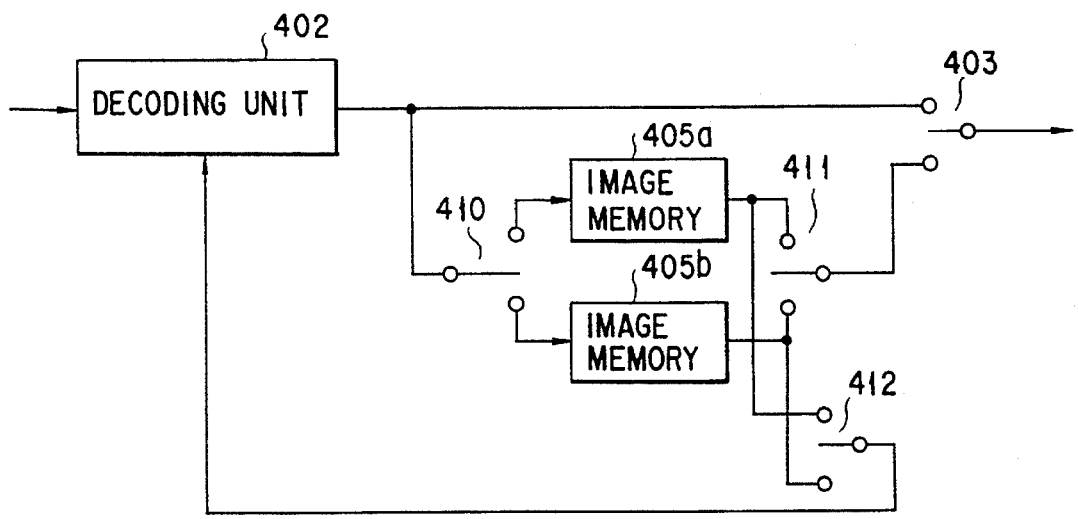
FIG. 11A illustrates how the frame memories are used in the apparatus of the present invention.
FIG. 11B is a block diagram of the peripheral circuitry of the frame memories provided for the apparatus of the invention.
FIG. 12 graphically shows the search time effect in using a method of using the frame memories in the apparatus of the invention.

To always hold the image data on the frame now being displayed, the start frame, and the mid-point frame as shown in FIG. 10B, the frame memories 405a and 405b are used with the frame timing as shown in FIG. 11A. D1 to D12 indicate image data items for display, and M1 to M6 represent image data items for still pictures. For instance, when frame 3 is displayed, image data D3 is read from memory 405b and image data M1 on frame 1 is retained in frame memory 405a. When frame 6 is displayed, image data D6 is read from memory 405a and image data M3 on frame 3 is retained in frame memory 405b. When frame 12 is displayed, image data D12 is read from memory 405b and image data M6 on frame 6 is retained in frame memory 405a.

FIG. 11B is a block diagram of a switching circuit for switching between the two frame memories 405a and 405b. When the memory is used as a frame memory for display, the decode output of the decoding unit 402 is supplied via a switch 410 and the output is read via a display switch 411. In a frame return reproduction, the output of the frame memory for still pictures is fed back via a feedback switch 412 to the decoding unit 402.

An example of computing the time required for frame return reproduction will be given.

For example, in the display state of FIG. 10C, the display memory stores the image data on the 12th frame, and the still-image memory stores the image data on the 6th frame. It is assumed that the average decoding time per frame is $t_{de}$. If the 11th frame is reproduced by frame return, the average decoding time will be 5 $t_{de}$ because the data on the sixth frame and later can be used in sequence. When the fourth frame is reproduced by frame return, the decoding average time will be 4 $t_{de}$ if the decoding starts at the first frame. If there is no image data on the sixth frame and the 11th frame is to be reproduced, decoding must be started at the first frame, which requires 11 $t_{de}$.

When frame return reproductions are carried out consecutively, for example, when the reproduction of the 11th frame, that of the 10th frame, . . . , that of the seventh frame are effected one after another, calculating the time required for those reproductions gives the results as shown in FIG. 12. When there is no image data on the sixth frame as shown in FIG. 10C, 46 $t_{de}$ is required as shown in calculation example (A) in FIG. 12. With the method of storing the image data on the frame immediately before the frame now being displayed, 35 $t_{de}$ is needed for the same reproductions as shown in the calculation example (B) in FIG. 12. With the method of storing the image data on the mid-point frame, only 10 $t_{de}$ is required as shown in calculation example (C).

In the above explanation, a data unit is stored in the data unit memory 406 of FIG. 8, and frame return reproduction is effected within a single GOP in the data unit. However, there may be a case where frame return or supply reproduction is not necessarily completed within a single data unit, but can extend over GOPs or data units.

To deal with such a case, the data covering two data units may be stored previously in the data unit memory 406.

FIG. 13A is a block diagram of the data unit memory 406, which contains, for example, storage sections 406a, 406b, and 406c for holding three groups of pictures (GOPs). A GOP is stored in each GOP storage section via a switch 406d. Three GOPs are always held in the memory 406. Reading is done via a switch 406e. In a normal operation, the units immediately in time before and after the data unit to be reproduced are always pooled. The GOP read for display is the central GOP. It is assumed that in a state shown by broken lines in FIG. 13B, GOP1, GOP2, and GOP3 are stored in the storage sections 406c, 406a, and 406b, respectively. In this state, a GOP to be decoded and reproduced is GOP2. After the reproduction of GOP2 is finished, the reproduction of GOP3 starts. At this time, GOP4, the next one, is read from the disk and stored in the storage section 406c. In this way, what is to be reproduced and written is updated one after another.

In the frame return or supply reproduction mode, operation proceeds as follows. It is assumed that data is stored as shown by broken lines. It is also assumed that frame return reproduction of GOP2 is achieved as explained above. When the frame return has reached the start frame of GOP2, GOP0, one before the preceding GOP, is written in the storage section 406b, and the frame return of GOP1 is performed continuously. Conversely, it is assumed that frame supply is performed. At this time, when the end frame of GOP2 is reached in the frame supply, the frame supply of GOP3 is then performed, and GOP4, the following one, is written in the storage section 406c.

Figure 14:
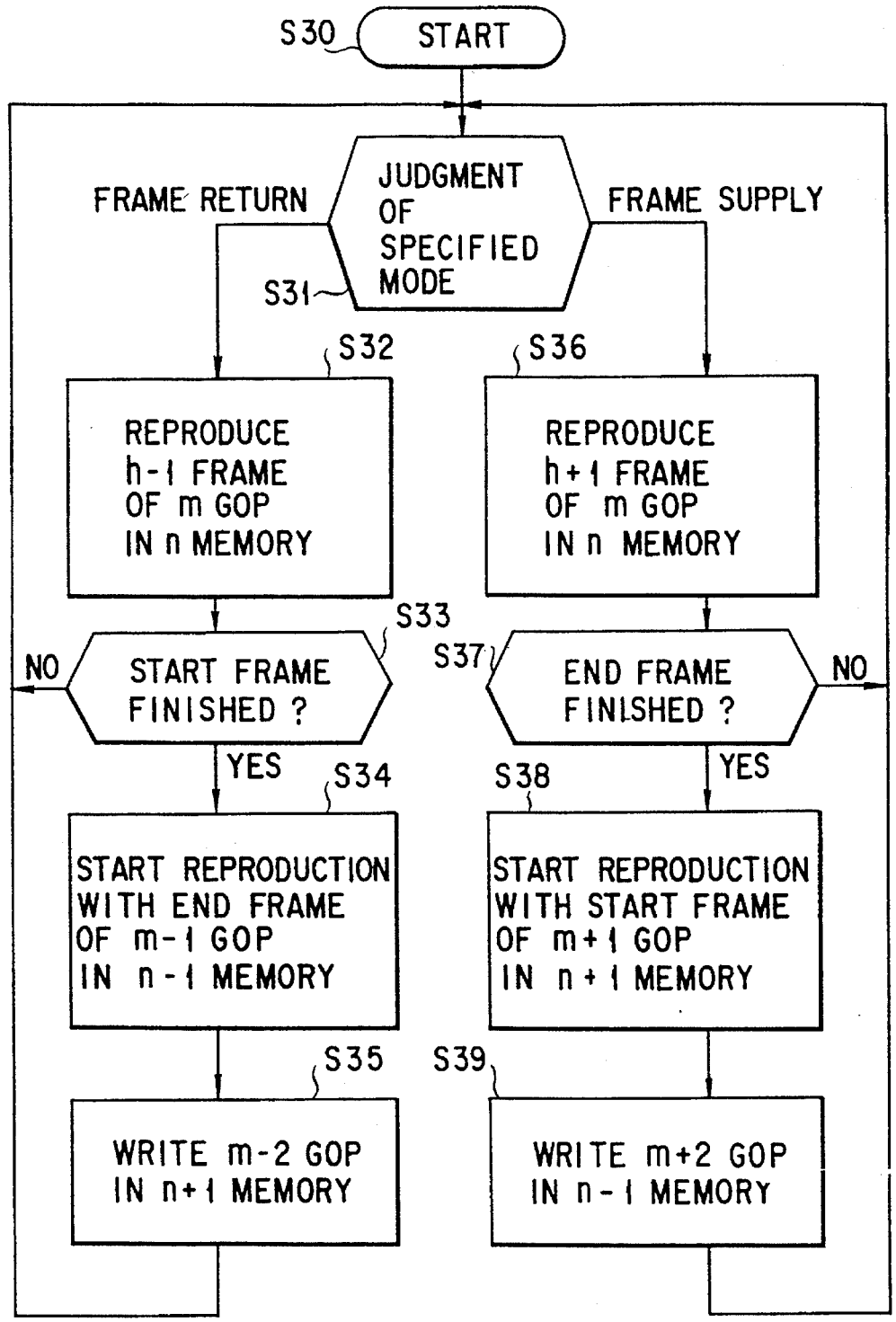
FIG. 14 is a flowchart of the operation of the circuit of FIG. 13A.

FIG. 14 is a flowchart for the above operation. The frame return routine comprises steps S31 to S35. The frame supply routine comprises steps S31 to S39.

As has been explained above, with this invention, it is possible to search for and reproduce a desired frame image at high speeds. These features hold true for frame return reproduction.

Figure 15:
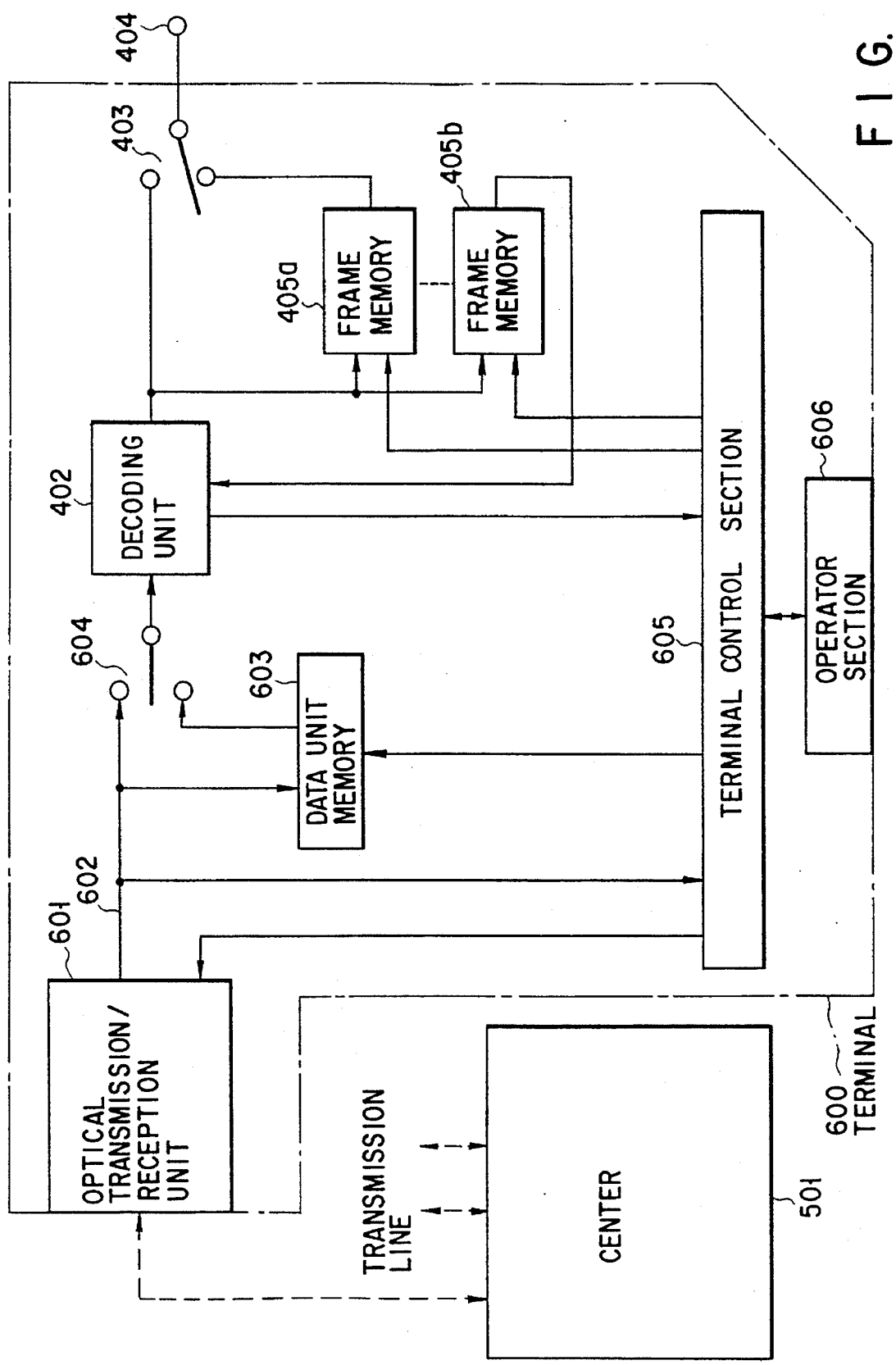
FIG. 15 is a block diagram of another searching section of a terminal of the present invention.

FIG. 15 is a block diagram of still another embodiment of the present invention.

An optical disk and pickup means are provided in a center 501. The data units read from the optical disk are received by an optical transmission/reception unit 601 in a terminal 600 via an optical transmitting unit and an optical transmission line. The optical transmission/reception unit 601 contains a photoelectric converter. The transmitted data units are directed to an output terminal 602, from which they are supplied to a data unit memory 603 and to one terminal of a switch 604. The fact that the data units have arrived is sensed by a terminal control section 605. The output of the switch 604 is inputted to a decoding unit 402. The remaining configuration is the same as that explained in FIGS. 6 and 8.

It is possible to operate an operator section 606 in the terminal 600 to specify a desired disk number and program. Disk and program specifying information is generated at the terminal control section 605, and is converted into an optical signal at the optical transmission/reception unit 601, which then transmits the optical signal to the center 501. On the basis of the disk and program specifying information, the center 501 reproduces information from the specified disk, and transmits the reproduced information (including the management information and the image and sound information) via a bidirectional optical transmission line.

The center 501, which contains a video server, can transmit the programs requested by each terminal to the respective terminals via separate channels.

Figure 16:
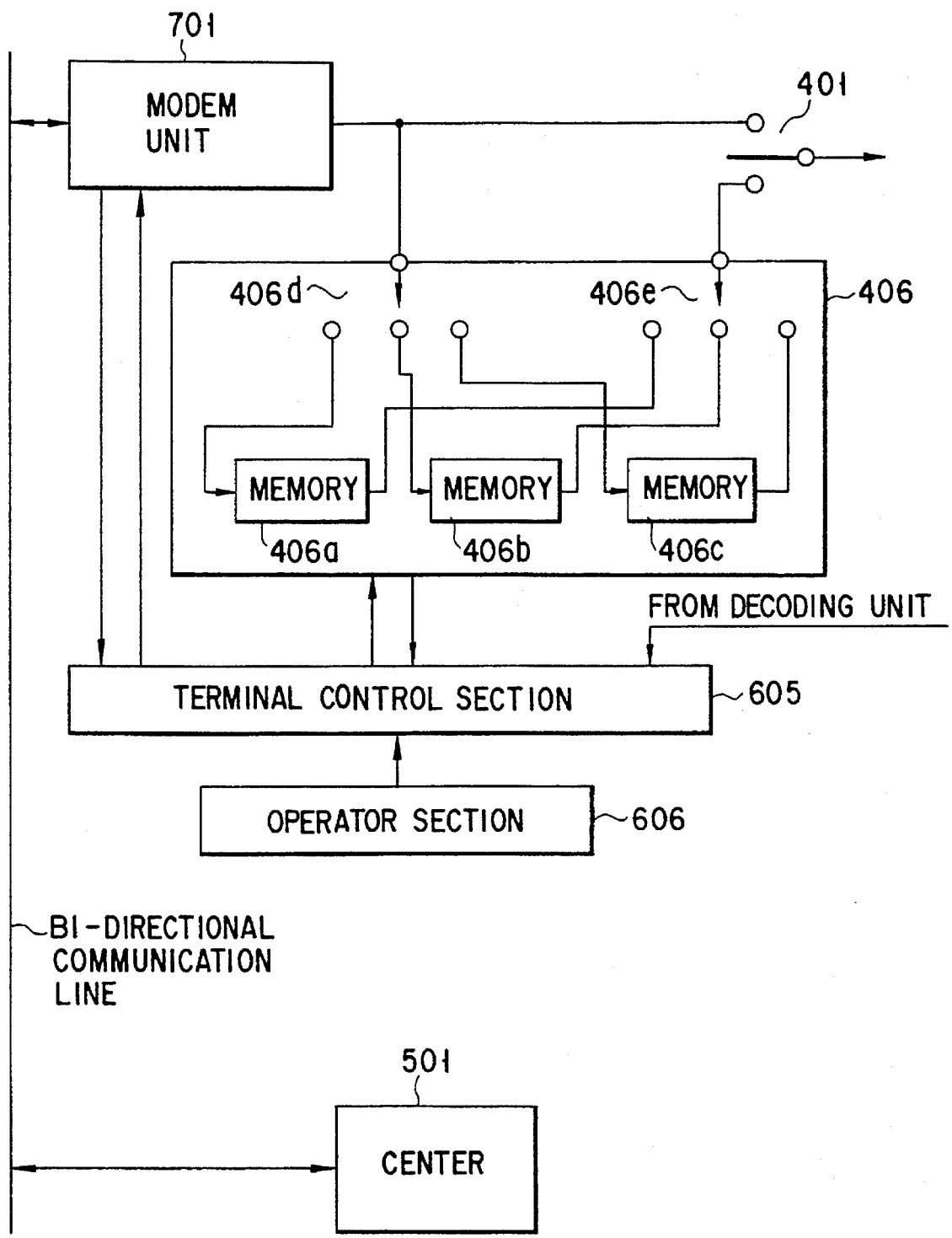
FIG. 16 is a block diagram of still another searching section of the terminal of the present invention.

FIG. 16 is a block diagram of still another embodiment of the present invention.

While FIG. 13 shows an internal configuration of the reproduction apparatus, FIG. 16 shows the configuration of a terminal according to this embodiment. Data units are taken in via a modulation/demodulation section (MODEM unit) 701. Specifically, an optical disk and pickup means are provided in a center 501. The data units read from the optical disk are transmitted via a bidirectional transmission line. The modulation/demodulation section 701 supplies the transmitted data units to a data unit memory 406 and a switch 401. The data unit memory 406 contains storage sections 406a, 406b, 406c that can store three group of pictures (GOPs), for example. One GOP is stored in one GOP storage section via a switch 406d. Three GOPs always exist inside the memory 406. Reading is done via a switch 406e. During a normal operation, the units before and after the data unit to be reproduced are always pooled. The GOP to be read for display is the central GOP. The subsequent operations are as explained in FIGS. 13 and 14. This terminal is also provided with an operator section 606 and a terminal control section 605. In the system, the center 501, which contains a video server, can transmit the programs requested by each terminal to the respective terminal via separate channels. The terminal control section 605 always keeps track of the storage section in a reading state and the frame number being decoded. For example, when the storage section in a reading state is changed from section 406a to 406b, the terminal control section 605 will request data units from the center 501.

As described above, searching through frame supply and frame return can be effected even if a recording medium is remotely located.

FIG. 17 is a flowchart provided for the terminal control section 605 in the terminal of FIG. 16. The operation according to this flowchart starts when the frame supply reproduction or frame return reproduction mode is specified. In the initial state, data is requested from the center 501 (steps S51, S52). The center 501 transmits GOPs of data, one by one. The terminal checks to see if GOPs of data have been received one by one (S53, S54). When one GOP of data has been received, the value n of a counter acting as a GOP monitor is counted up, and the received GOPs are stored in the memory 406 (S55 to S57). Additionally, it is judged whether or not three GOPs have been stored.

Then, it is judged whether or not a frame return command has been entered from the operator section 606 (step S58). If a frame return command is present, it is judged whether or not the current output frame is what has been obtained by decoding the data of GOP(n-1). In a normal reproduce operation, GOPs are reproduced in this order: GOP(n+1), GOP(n), GOP(n-1). When the current frame is what has been decoded from data of GOP(n-1), and frame return is effected, GOP(n-2) is needed. Then, n in the GOP monitor is changed to n-1, and GOP(n-1) is requested from the center (steps S60, S61). From this time on, the processing at step S62 is carried out, then control goes to step S56.

Figure 18:
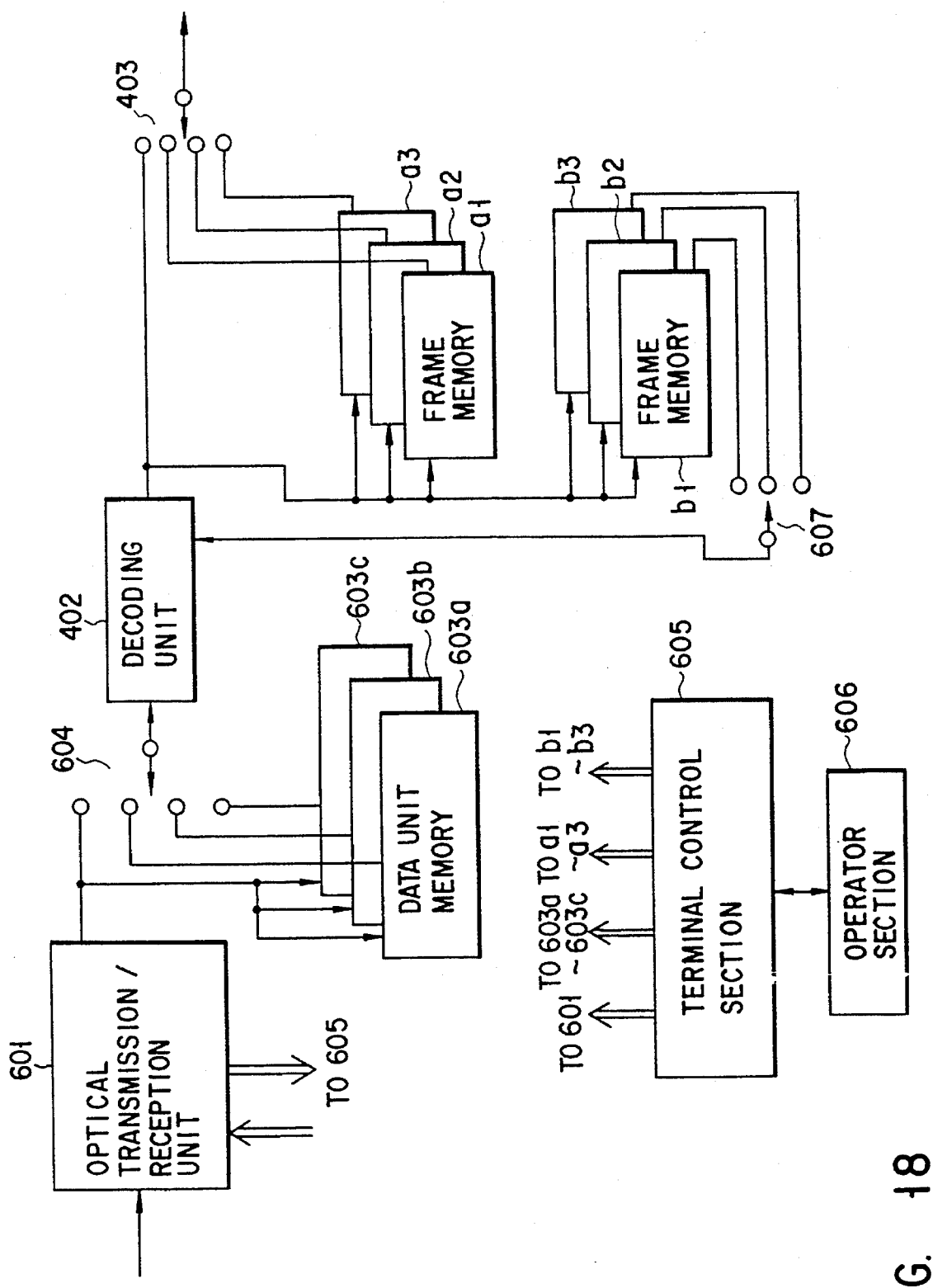
FIG. 18 is a block diagram of the searching section of the terminal of the present invention.

FIG. 18 shows an embodiment constructed by further adding a data unit memory, a frame memory, etc. to the embodiment of FIG. 15.

The data units received by an optical transmission/reception unit 601 can be loaded into any of data unit memories 603a to 603c under the control of a terminal control section 605. A switch 604 selects any one of the output data units from the optical transmission/reception unit 601 and those from the data unit memories 603a to 603c, and the selected one is supplied to a decoding unit 402. The decoded frame data is supplied to the frame memories a1 to a3, and b1 to b3. A switch 403 selects any one of the outputs of the frame memories a1 to a3, and supplies the selected one. A switch 607 selects any one of the frame memories b1 to b3, and feeds the selected one back to the decoding unit 402 as decoding data.

With the terminal thus constructed, the existence of many memories is helpful in searching for images in a frame supply or frame return operation. It is also possible to take in image data through a plurality of channels from the center, edit it at the terminal side, and obtain the edited image data.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for reproducing data on a disk in which a management area is formed in a portion thereof and a data area is formed in another portion thereof, programs being recorded in said data area, each of said programs being composed of a plurality of data units, said apparatus comprising:

pickup means for reading the information from said disk;

demodulation means for demodulating an output signal of said pickup means;

management information storage means for storing management information in said management area output from said demodulation means;

a data unit memory for storing said data units output from said demodulation means;

video decode means for decoding video information on said data units output from said demodulation means, said data units including:

compressed data obtained by compressing, using frame correlation, a plurality of frames of video information as a motion picture, said compressed data including non-compressed frame data and a plurality of difference data, the non-compressed frame data being input to said video decode means when the compressed data is decoded and the plurality of difference data being input to said video decode means in a predetermined order so that decoded frame data corresponding to said plurality of difference data is obtained, and start address information indicating the start addresses of said plurality of data units, said start address information being stored in said management area;

an image memory for storing a frame (or a field) of image data output from said video decode means;

first control means for calculating in which data unit on said disk a target frame corresponding to an inputted frame number belongs, reading the calculated target data unit from said disk according to the start address in said management information, and storing the target data unit in said data unit memory;

second control means for supplying the video information on said stored target data unit to said video decode means wherein said video decode means decodes the video information, said second control means including:

means for storing in said image memory the decoded frame data located in an intermediate position between the start frame of said tarmet data unit and the target frame, and means for using the decoded frame data stored in said image memory to reduce a period of time required for reproducing a new target frame when the target frame is changed; and third control means for counting frame synchronizing pulses while decoding the video information on said target data unit and performing still reproduction by storing the decoded output in said image memory when said target frame is decoded.

2. A reproduction apparatus with a search function according to claim 1, further comprising:

means for, when a frame number is inputted for said high-speed searching, causing said image memory to retain the decode output of the present frame outputted from said video decode means until said target frame has been decoded.

3. A reproduction apparatus with a search function according to claim 1, further comprising means for supplying the decoded frame data stored in said image memory to said video decode means when a frame return signal is input to cause the video decode means to decode frames, starting at the frame next to said decoded frame data, on the basis of the decoded frame data and the difference data read from said data unit memory.

4. A reproduction apparatus with a search function according to claim 1, wherein said data unit memory contains areas for storing not only the data unit being reproduced but also the data units before and after the currently reproduced data unit.

5. An apparatus for reproducing data on a recording medium in which a management area is formed in a portion thereof and a data area is formed in another portion thereof, programs being recorded in said data area, each of said programs being composed of a plurality of data units, the apparatus comprising:

pickup means for reading the information from said recording medium, demodulation means for demodulating an output signal of said pickup means;

management information means for storing management information in said management area output from said demodulation means;

a data unit memory for storing said data units output from said demodulation means;

video decode means for decoding video information on said data units output from said demodulation means, said data units including:

compressed data obtained by compressing, using frame correlation, plurality of frames of video information as a motion picture, said compressed data including non-compressed frame data and a plurality of difference data, the non-compressed frame data being input to said video decode means when the compressed data is decoded and the plurality of difference data being input to said video decode means in a predetermined order so that decoded frame data corresponding to said plurality of difference data is obtained, and start address information indicating the start addresses of said plurality of data units, said start address information being stored in said management area;

an image memory for storing a frame (or a field) of image data output from said video decode means;

first control means for calculating in which data unit on said recording medium a target frame corresponding to an inputted frame number belongs, reading the calculated target data unit from said recording medium according to the start address in said management information, and storing the target data unit in said data unit memory;

second control means for supplying the video information on said stored target data unit to said video decode means wherein said video decode means decodes the video information, said second control means including:

means for storing in said image memory the decoded frame data located in an intermediate position between the start frame of said target data unit and the target frame, and means for using the decoded frame data stored in the image memory to reduce a period of time required for reproducing a new target frame when the target frame is changed; and third control means for counting frame synchronizing pulses while decoding the video information on said target data unit and performing still reproduction by storing the decoded output in said image memory when said target frame is decoded.

6. A reproduction apparatus with a search function according to claim 5, wherein said recording medium is either a semiconductor memory or magnetic tape.

7. A processor which receives data from an apparatus for reproducing data in a recording medium in which a management area is formed in a portion thereof and a data area is formed in another portion thereof, programs being recorded in said data area, said processor comprising:

management information storage means for storing management information in said management area transmitted from said reproduction apparatus;

a data unit memory for storing said data units transmitted from said reproduction apparatus;

video decode means for decoding video information on said data units, said data units including:

compressed data obtained by compressing, using frame correlation, a plurality of frames of video information as a motion picture, said compressed data including non-compressed frame data and a plurality of difference data, the non-compressed frame data being input to said video decode means when the compressed data is decoded and the plurality of difference data being input to said video decode means in a predetermined order so that decoded frame data corresponding to said plurality of difference data is obtained, and start address information indicating the start addresses of said plurality of data units, said start address information being stored in said management area;

an image memory for storing a frame (or a field) of image data output from said video decode means;

first control means for calculating in which data unit on said recording medium a target frame corresponding to an inputted frame number belongs, requesting the calculated target data unit from said reproduction apparatus according to the start address in said management information, and storing the target data unit in said data unit memory;

second control means for supplying the video information on said stored target data unit to said video decode means wherein said video decode means decodes the video information, said second control means including:

means for storing in said image memory the decoded frame data located in an intermediate position between the start frame of said target data unit and the target frame, and means for using the decoded frame data stored in the image memory to reduce a period of time required for reproducing a new target frame when the target frame is changed; and third control means for counting frame synchronizing pulses while decoding the video information on said target data unit and performing still reproduction by storing the decoded output in said image memory when said target frame is decoded.

8. A reproduction apparatus with a search function according to claim 7, further comprising:

means for, when a frame number is inputted for said high-speed searching, causing said image memory to retain the decode output of the present frame outputted from said video decode means until said target frame has been decoded.

9. An apparatus for reproducing data on a recording medium in which a management area is formed in a portion thereof and a data area is formed in another portion thereof, programs being recorded in said data area, each of said programs being composed of a plurality of data units, the apparatus comprising:

pickup means for reading the information from said recording medium, demodulation means for demodulating an output signal of said pickup means;

management information means for storing management information in said management area output from said demodulation means;

a data unit memory capable of storing said plurality of data units output from said demodulation means in order to reduce a period of time required for reading said data units from said disk;

video decode means for decoding video information on said data units output from said demodulation means, said data units including:

compressed data obtained by compressing, using frame correlation, a plurality of frames of video information as a motion picture, said compressed data including non-compressed frame data and a plurality of difference data, the non-compressed frame data being input to said video decode means when the compressed data is decoded and the plurality of difference data being input to said video decode means in a predetermined order so that decoded frame data corresponding to said plurality of difference data is obtained, and start address information indicating the start addresses of said plurality of data units, said start address information being stored in said management area;

an image memory for storing a frame (or a field) of image data output from said video decode means;

first control means for calculating in which data unit on said disk a target frame corresponding to an inputted frame number belongs, reading the calculated target data unit from said recording medium according to the start address in said management information, and storing the target data unit in said data unit memory;

second control means for supplying the video information on a desired stored data unit from said data unit memory to said video decode means wherein said video decode means decodes the video information, said second control means including:

means for storing in said image memory the decoded frame data located in an intermediate position between the start frame of said target data unit and the target frame, and means for using the decoded frame data stored in the image memory to reduce a period of time required for reproducing a new target frame when the target frame is changed; and third control means for counting frame synchronizing pulses while decoding the video information on said target data unit and performing still reproduction by storing the decoded output in said image memory when said target frame is decoded.

* * * * *